UNITED STATES PATENT OFFICE.

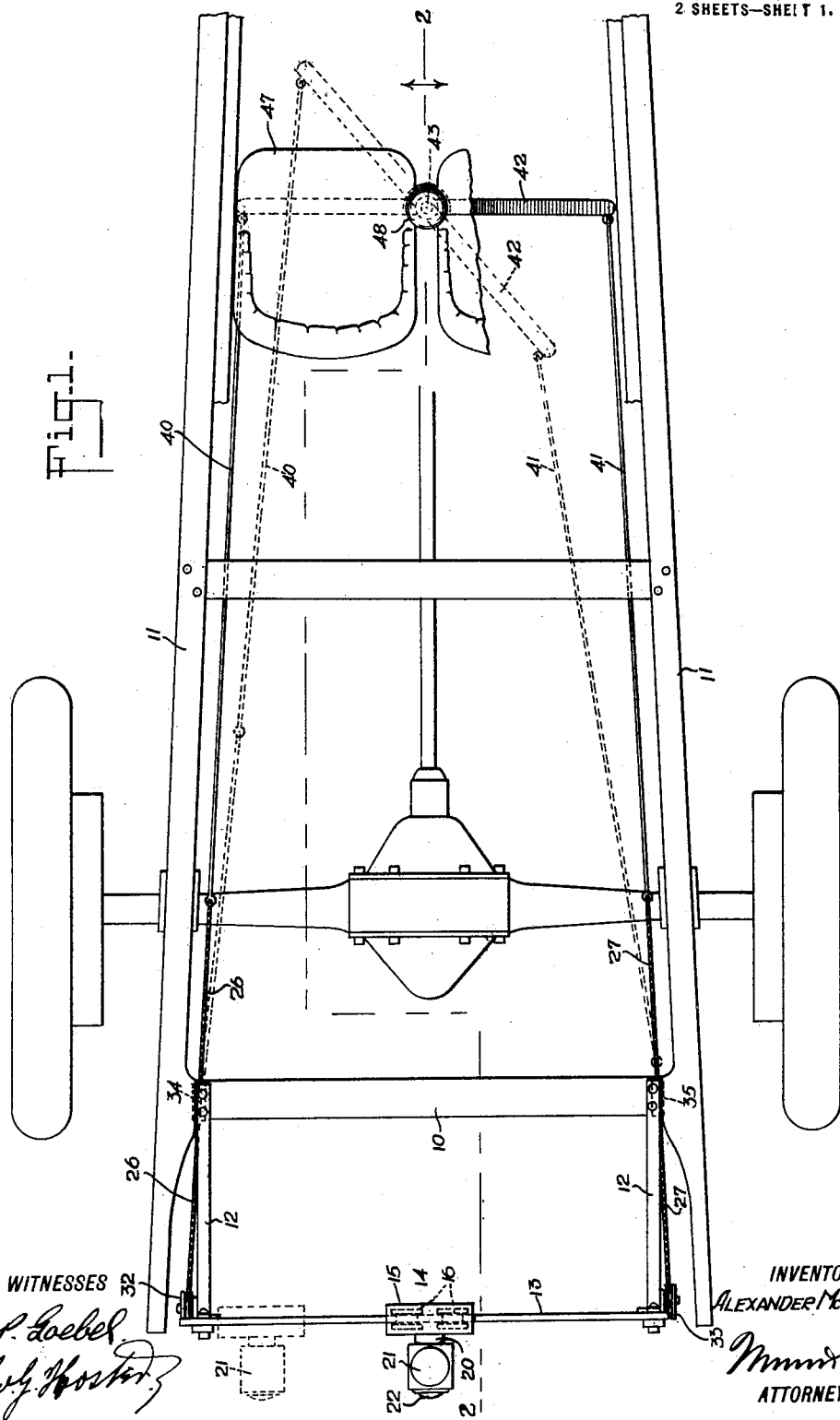

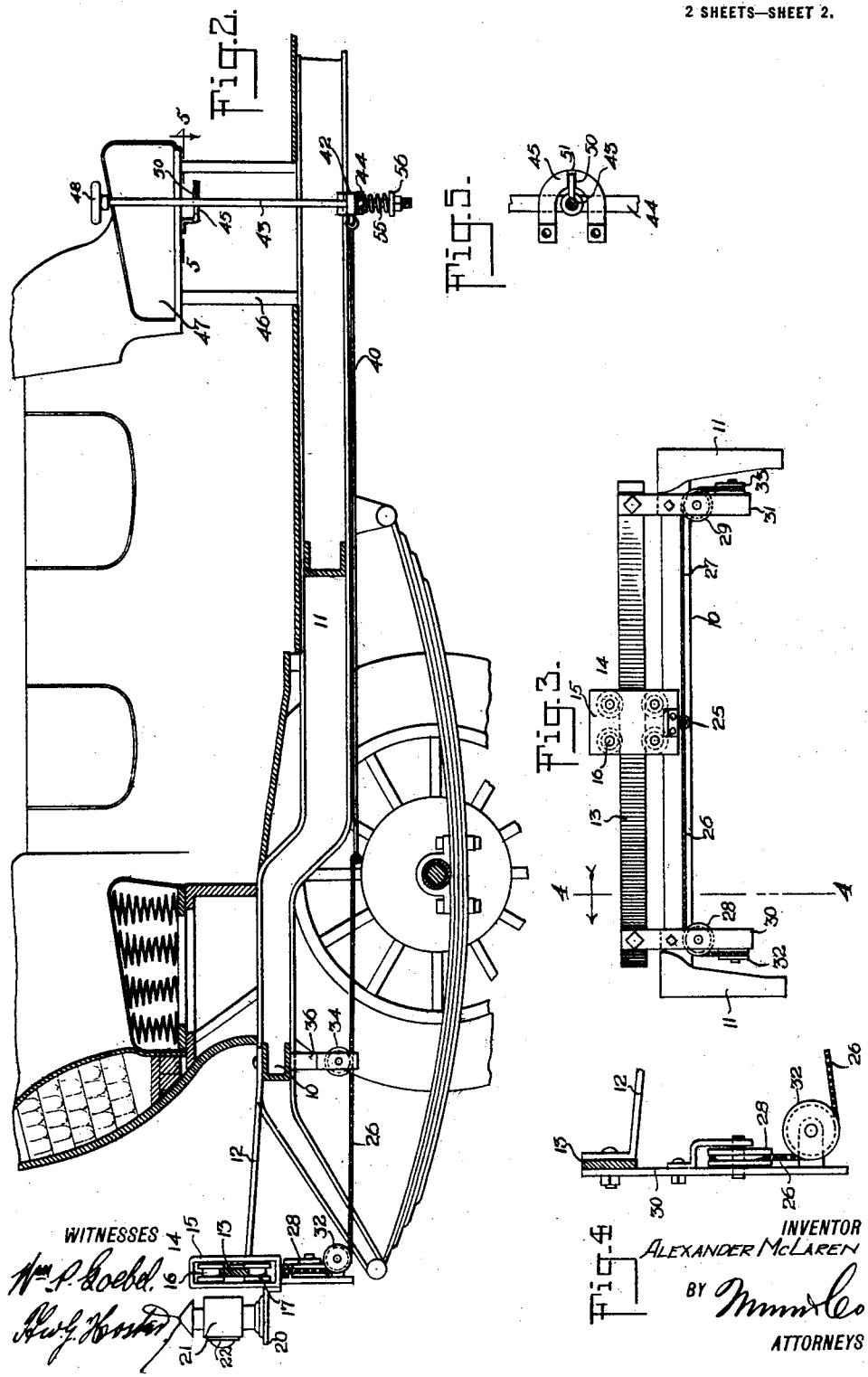

ALEXANDER McLAREN, OF BROOKLYN, NEW YORK.

SIGNALING DEVICE FOR AUTOMOBILES.

1,399,136. Specification of Letters Patent. Patented Dec. 6, 1921.

Application filed December 22, 1920. Serial No. 432,538.

*To all whom it may concern:*

Be it known that I, ALEXANDER MCLAREN, a citizen of the United States, and a resident of the city of New York, borough of Brooklyn, in the county of Kings and State of New York, have invented a new and Improved Signaling Device for Automobiles, of which the following is a full, clear, and exact description.

The object of the invention is to provide a new and improved signaling device for automobiles and other vehicles and arranged to signal to a following vehicle whether the automobile is going straight ahead or intends to turn out to the right or to the left.

Another object is to combine the usual tail light with the signaling device.

Another object is to permit ready installation of the signaling device on automobiles and other vehicles as now generally constructed.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved signaling device as applied to an automobile, part of the body being omitted;

Fig. 2 is a sectional side elevation of the same on the line 2—2 of Fig. 1.

Fig. 3 is a rear end view of the signaling device.

Fig. 4 is a sectional side elevation of the same on the line 4—4 of Fig. 3; and

Fig. 5 is a sectional plan view of the bearing and holding device for the operating shaft, the section being on the line 5—5 of Fig. 2.

On the rear crossbar 10 of the framework 11 of an automobile are secured rearwardly extending brackets 12 supporting a transversely extending bar 13 forming a guideway for a carriage 14 to travel on from normal central position to the right or to the left. The carriage 14 comprises a carriage frame 15 in which are journaled grooved top and bottom rollers 16 and 17 engaging the top and bottom edges of the crossbar 13 to allow convenient sidewise traveling of the carriage 14 on the crossbar 13 and without danger of the carriage becoming detached from the crossbar 13. On the frame 15 of the carriage 14 is secured a bracket 20 supporting a signal 21, preferably in the form of a lamp or lantern of any approved construction and having a rearwardly extending lens 22, preferably red, to permit the lamp to serve as a tail light in addition to being a signal. Normally the carriage 14 is in central position, as shown in full lines in Fig. 1, thus indicating to a following vehicle that the automobile intends to travel straight ahead. When it is desired to turn out to the right or to the left then the carriage 14 and with it the signal 21 is moved sidewise in the corresponding direction to the right or to the left thus, indicating to a following vehicle that the driver of the automobile intends to turn out to the right or to the left.

The movement of the carriage 14 is controlled by the operator in charge of the automobile and for this purpose the following arrangement is made: On the under side of the frame 15 of the carriage 14 is secured a ring 25 on which are secured the rear ends of chains, ropes, cables or other flexible connections 26, 27 extending sidewise and passing over guide pulleys 28, 29 journaled on brackets 30 and 31 attached to and depending from the ends of the crossbar 13, as plainly shown in Figs. 3 and 4. The flexible connections 26 and 27 after leaving the guide pulleys 28, 29 pass around guide pulleys 32, 33 likewise journaled on the brackets 30 and 31 but arranged to direct the flexible connections 26, 27 forwardly, as plainly indicated in Figs. 1, 2 and 4. The forwardly extending portions of the flexible connections 26, 27 next pass under guide pulleys 34, 35 journaled in brackets 36 depending from the crossbar 10. The forward ends of the flexible connections 26, 27 are preferably connected by rods 40, 41 with the ends of a crossbar 42 secured on the lower end of a vertically disposed shaft 43 journaled in bearings 44 and 45, of which the bearing 44 is mounted on the framework 11 and the bearing 45 is attached to the support 46 of the driver's seat 47 so that the shaft 43 extends to one side of the driver's seat to be within convenient reach of the driver. The upper end of the shaft 43 is preferably provided with a suitable handwheel to permit the driver to conveniently turn the shaft 43 with a view to impart a swinging motion to the crossbar 42 to actuate the rods 40, 41 and the flexible connections 26, 27 to move the carriage 14 from normal central position either to the right or to the left or back to central position.

Normally the shaft 43 is held against being turned at the time the carriage 14 is in central position and for this purpose the following arrangement is made: On the shaft 43 is secured a pin 50 (see Figs. 2 and 5) normally resting in a recess or seat 51 formed on top of the bearing 45 to hold the shaft 43 against turning. When it is desired to move the carriage 14 to the right or to the left the driver or operator first lifts the handle 48 and with it the shaft 43 to disengage the pin 50 from the recess 51 and then to turn the shaft 43 in the desired direction, that is, according to the direction in which the carriage 14 is to be moved from central position to the right or to the left. It is understood that after the shaft 43 has been lifted and slightly turned then the pin 50 can travel on top of the bearing 45 until the carriage 14 reaches the desired sidewise position without the operator being compelled to hold the shaft 43 in raised position. When the carriage 14 is returned from sidewise to central position on the operator correspondingly turning the shaft 43 then the pin 50 finally snaps into the recess 51 to lock again the shaft 43 against accidental turning at the time the carriage 14 is in central position. The shaft 43 is held in lowermost position by the action of a spring 55 coiled on the lower portion of the shaft 43 and resting on a washer 56 attached to the lower end of the shaft. The upper end of the spring 55 abuts against the under side of the bearing 44. Thus the spring 55 exerts a downward pressure on the shaft 43 to hold normally the pin 50 in engagement with the recess 51 to prevent accidental displacement of the carriage 14 when in normal central position.

In case of heavy traffic, short, quick, sidewise movements may be given to the carriage 14 to signal to a following vehicle the intention of slowing down or coming to a stop. If desired, the signaling device may be arranged in the front of the automobile, preferably at the windshield.

Having thus described my invention, I claim as new and desire to secure by Letters Patent:—

1. In a signaling device for automobiles, a transverse guideway at the rear of the automobile, a carriage provided with rollers engaging the guideway, a lamp support carried by the carriage, a vertical shaft under the control of the operator, cables secured to the carriage, and means for connecting the cables with the said shaft.

2. In a signaling device for automobiles, a transverse guideway on the rear of the automobile, a carriage provided with rollers engaging the upper and lower sides of the guideway, a lamp support carried by the carriage, a vertical shaft provided with means under the control of the operator of the vehicle for turning the shaft, a crossbar mounted on the said shaft, connections connecting the said carriage with the ends of the said crossbar, and means normally holding the shaft against turning at the time the carriage is in central position.

3. In a signaling device for automobiles comprising a transverse bar mounted on the rear end of an automobile, a carriage having grooved wheels engaging the upper and lower edges of the said bar, a bracket on the said carriage adapted to support a lamp, flexible connections attached to the said carriage, guide pulleys over which the said connections pass, an upright shaft provided at its upper end with means for turning the shaft, a crossbar on the lower end of the said shaft, and links connecting the said flexible connections with the cross bar.

4. In a signaling device for automobiles comprising a transverse bar mounted on the rear end of an automobile, a carriage having grooved wheels engaging the upper and lower edges of the said bar, a bracket on the said carriage adapted to support a lamp, flexible connections attached to the said carriage, guide pulleys over which the said connections pass, an upright shaft provided at its upper end with means for turning the shaft, a crossbar on the lower end of the said shaft and connected with the said flexible connections, a pin on the said shaft, and a bearing for the said shaft and provided with a seat for the said pin to hold the shaft against turning at the time the carriage is in central position.

ALEXANDER McLAREN.